United States Patent [19]

Van Rooij

[11] Patent Number: 4,669,022

[45] Date of Patent: May 26, 1987

[54] MAGNETIC-TAPE SCANNING DEVICE WITH IMPROVED RATING TRANSFORMER MOUNTING AND METHOD OF MANUFACTURING SUCH A DEVICE

[75] Inventor: Juliaan J. M. R. Van Rooij, Eindhoven, Netherlands

[73] Assignee: U.S. Philips Corporation, New York, N.Y.

[21] Appl. No.: 456,237

[22] Filed: Jan. 7, 1983

[30] Foreign Application Priority Data

Oct. 11, 1982 [NL] Netherlands ............................ 8203922

[51] Int. Cl.⁴ ........................ G11B 5/027; G11B 15/66
[52] U.S. Cl. .................................. 360/84; 360/130.24
[58] Field of Search ............ 360/84, 107, 108, 130.22, 360/130.23, 130.24; 310/209, 261, 268

[56] References Cited

U.S. PATENT DOCUMENTS 3,974,017  8/1976  Tanigawa et al. .................... 156/64
4,117,519  9/1978  Shioyama et al. .................... 360/84
4,210,945  7/1980  Lavrentiev et al. ................ 360/108
4,408,239 10/1983  Ushiro ................................ 360/107
4,517,615  5/1985  Hino .................................... 360/84

Primary Examiner—John H. Wolff
Assistant Examiner—Melissa J. Koval
Attorney, Agent, or Firm—David R. Treacy

[57] ABSTRACT

A rotary scanning device having a rotary transformer in which a transformer ring is glued to a scanning means. The effects of temperature and humidity on the rotary transformer gap spacing are reduced by utilizing a first thin layer of glue between the transformer ring and a support which extends into a hole in the scanning means, and a second layer of glue extending radially between a cylindrical surface of the support and the inner wall of the hole. A radiation transparent support, and radiation-curable glue may be used, so that the two distinct layers may be cured simultaneously by radiation directed into the support through a hole in the scanning means.

8 Claims, 3 Drawing Figures

MAGNETIC-TAPE SCANNING DEVICE WITH IMPROVED RATING TRANSFORMER MOUNTING AND METHOD OF MANUFACTURING SUCH A DEVICE

BACKGROUND OF THE INVENTION

The invention relates to a magnetic-tape scanning device comprising a rotatable scanning means which is rotatable about a spindle axis and carries at least one magnetic head, and a rotary transformer; and more particularly to such a device which comprises a rotatable transformer ring, which is concentric with the spindle axis and which is secured to the rotatable scanning means, and a stationary transformer ring, which is secured to the stationary scanning means opposite the rotatable transformer ring so that a narrow axial air gap is formed between these rings. At least one of the two transformer rings is mounted via a plurality of cylindrical supports for the transformer ring, which supports have a cylindrical surface and first and second end faces, and quantities of glue fuming a first layer of glue between the first end face of each support and the transformer ring and a second layer of glue for securing the transformer ring to the relevant scanning means.

Such magnetic-tape scanning devices are employed in magnetic video-tape recorders, for example Philips type VR 2020. The transformer rings provide the contactless signal transfer from and to the rotating magnetic heads through the air gap between the two transformer rings. In this known magnetic-tape scanning device the stationary transformer ring is supported by three supports.

For an efficient signal transfer between the two transformer rings the axial spacing between the two transformer rings should be very small, of the order of magnitude of nominally 60 microns with a tolerance of approximately 30 microns to each side. This small dimension of the air gap should be maintained within a temperature range from −25° C. to +75° C. and for a relative humidity of 95% at 55° C. Since the rotatable transformer ring is arranged on the rotatable scanning means, and the stationary transformer ring is on the stationary scanning means, the dimension of the air gap between the two transformer rings will depend on the accuracy of the respective mountings of the rings to the scanning means, and the length of the axial air gap between the rotatable and the stationary scanning means. This necessitates an accurate adjustment of the axial distance of each transformer ring relative to the air gap edge of the respective scanning means on which the transformer ring is mounted. When the rotatable scanning means is mounted on the stationary scanning means this axial air gap is adjusted accurately under standard conditions. Temperature variations of the magnetic-tape scanning device may affect the dimension of the axial air gap between the scanning means, which has a direct influence on the air gap between the two transformer rings.

In this known magnetic-tape scanning device the first end faces of the three supports are glued to that side of the transformer ring which is remote from the air gap by means of the first layer of glue. When the first layers of glue have cured the transformer ring is placed in a lathe and the second end faces of the supports are machined accurately. These second end faces serve to co-operate with a machined portion of the scanning means. The scanning means should also be machined accurately, in particular the axial distance between the air gap edge of the scanning means and this machined portion must be formed very accurately and with a very small tolerance of the order of magnitude of 10 microns. Now drops of glue are applied to that side of the transformer ring where the supports are situated, at locations between the supports. After this the transformer ring is placed in the scanning means, so that the applied drops of glue connect the transformer ring directly to the scanning means. Consequently, no layer of glue is present between the second end faces of the supports and the scanning means. This is because layers of glue at these locations would affect the axial position of the transformer ring and as a result of the sensitivity to moisture and heat of the known types of glue, would give rise to variations of said distance and thus to variations of the air gap between the two transformer rings.

It has been found that in the known magnetic-tape scanning device the thickness of the layer of glue between the transformer ring and the scanning means may still vary, in particular under the influence of atmospheric moisture, such that the layer of glue becomes permanently thicker, which results in an undesired reduction of the air gap between the transformer rings.

SUMMARY OF THE INVENTION

It is the object of the invention to provide a magnetic-tape scanning device of the type described above, in which the dimension of the air gap between the transformer rings can be smaller than in the known magnetic-tape scanning device and is less affected by the atmospheric-moisture content, and furthermore to provide such a device which is cheaper to manufacture and demands a less intricate assembly process.

The invention is characterized in that the relevant scanning means is formed with through holes which receive the supports with radial clearance, and the second layer of glue is an annular layer situated in that clearance, substantially exlusively between the inner wall of the hole and the cylindrical surface of the support.

In a magnetic-tape scanning device in accordance with the invention the second layer of glue is subjected only to shear as a result of axial forces exerted on the transformer ring. Conversely, the second layer of glue can exert only forces in the shear direction on the transformer ring. However, variations in the thickness of the second layer of glue as a result of variations in temperature and relative humidity do not occur in the shear direction, so that in principle the axial position of the transformer ring is not influenced at all. The axial position of the transformer ring relative to the edge of the scanning means can be adjusted by accurate auxiliary tools and does not depend on the length of the supports.

A preferred embodiment of the invention is characterized in that the axial clearance between the transformer ring and the scanning means, which are connected to each other by the gluing means, is sufficient to prevent any excess of the glue, the forming the first layers of glue between the ends of the supports and the transformer ring, from making contact with the scanning means.

The use of the invention ensures that only the planar first layers of glue can influence the axial position of the transformer ring relative to the scanning means.

Another embodiment of the invention makes it possible to obtain a very short cycle time during assembly and is characterized in that the supports are made of a radiation-transparent material and at least one of the layers of glue is of a type of glue which cures under the influence of radiation. This embodiment is possible because the supports are arranged in through holes, so that the second ends of the supports can be exposed to radiation, for example ultraviolet light.

The invention also relates to a method of manufacturing a magnetic-tape scanning device of the type described above foregoing. This method is characterized in that the annular transformer ring and the scanning means to which this ring is to be secured are arranged on an auxiliary tool in the desired accurate position relative to each other. The tool supports the transformer ring and the scanning means on the respective sides which should face the air gap between the two transformer rings, and the air gap between the two scanning means, respectively, and the supports are inserted from the other side of the scanning means.

By the use of the invention the accuracy of the final product is determined not so much by the accuracy of the components used as by the accuracy of the auxiliary tool. The use of the invention allows much larger tolerances in the thicknesses of the transformer rings. The requirements imposed on the accuracy of the diameter and the length of the supports are not stringent.

The influence of the thickness in the axial direction of the first layers of glue may be reduced by the use of a variant of the method in accordance with the invention. This variant is characterized in that the axial thickness of the first layers of glue, after application of these layers, is reduced by urging the supports and the transformer ring towards each other while the first layers of glue are still deformable. If the final layer of glue is thinner, possible variations in thickness of said layer become smaller.

Since the accuracy of the product is now mainly determined by the accuracy of the auxiliary tool it appears that the tolerances of the components may be at least a factor 10 wider. The dimension of the axial air gap between the two transformer rings may be reduced to substantially half that existing in the known magnetic-tape scanning device. The deviations of the final product may become some 30% smaller. The diameter of the transformer rings may be reduced while maintaining the inductive coupling between the two transformer rings. This not only reduces the price of the transformer rings but it also mitigates problems which may arise as a result of warping of the transformer rings. The supports, when they are made of metal, may consist of simple blanks and they require no finishing operation. Satisfactory results have been obtained with acrylate glue, a so-called second-generation glue comprising two components. The curing time is approximately six minutes, so that a comparatively short cycle time can be achieved.

An embodiment of the invention will now be described in more detail, by way of example, with reference to the drawing.

DESCRIPTION OF THE PREFERRED EMBODIMENT

Figure 1:
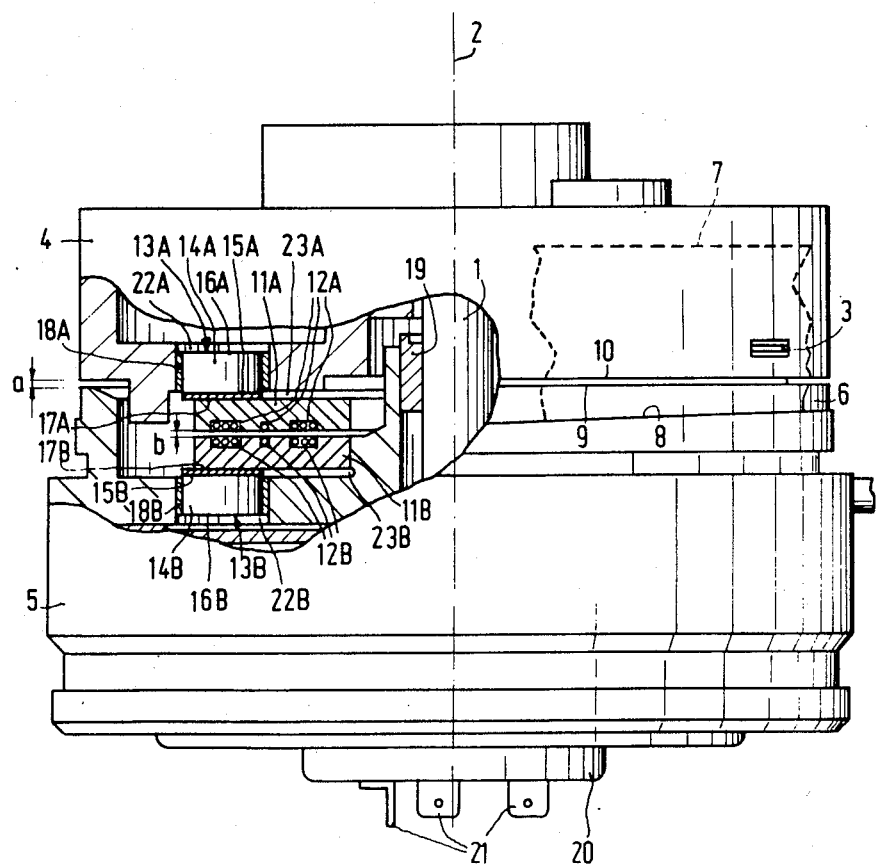
FIG. 1 is a side view and partly sectional view of a magnetic-tape scanning device showing the position of the two transformer rings.

The magnetic-tape scanning device comprises a spindle 1 with a spindle axis 2. Two magnetic heads 3, of which one head is shown in FIG. 1, the other head being disposed at a diametrically opposite location, are rotatable in a circular path around the spindle axis 2. A rotatable scanning means in the form of a cylindrical head drum 4 is mounted on the spindle 22 and carries the magnetic heads 3. A stationary scanning means 5, generally referred to as the lower drum, has an external guide surface 6 which is coaxial with the spindle axis for guiding a loop of magnetic tape 7 past the magnetic heads 3. For simplicity only a small part of the magnetic tape 7 is indicated by a broken line in FIG. 1. In the axial direction the magnetic tape is guided by a guide edge 8 on the lower drum 5. This guide edge hs a helical shape so that the magnetic tape 7 can be guided in a helical path around the assembly comprising the head drum 4 and the lower drum 5. Thus, it is possible to record and read oblique tracks on the magnetic tape 7 by means of the magnetic heads 3. Such a method of guiding the magnetic tape and such a method of recording and reading the magnetic tape are customary in any magnetic video-tape recorded for domestic use and will not be described in more detail. The lower drum has an edge 9 at a small distance from a similar edge 10 of the head drum, so that a small axial air gap a is formed between the rotatable head drum 4 and the stationary lower drum 5.

In the interior of the assembly comprising the head drum and the lower drum transformer means are arranged, which means comprise a rotatable transformer ring 11A, which is concentric with the spindle axis 2 and which is arranged on the rotatable head drum, and a stationary transformer ring 11B, which is secured to the stationary lower drum opposite said first mentioned transformer ring so that a narrow axial air gap b is formed. These transformer rings are made of a sintered ceramic material and their facing sides are surface-ground. Transformer windings 12A and 12B of an electrically conductive wire material are arranged in grooves in the flat sides of the respective transformer rings. Each of the two transformer rings is secured to the head drum and the lower drum respectively by gluing means. The gluing means comprise a plurality of cylindrical supports 13A and 13B, respectively, for the transformer rings 11A and 11B. They comprise cylindrical surfaces 14A and 14B, first end facess 15A and 15B and second end faces 16A and 16B. Furthermore, said means comprise an amount of glue for first layers of glue 17A and 17B between the first end faces of the supports and the transformer rings and second layers of glue 18A and 18B for securing the transformer rings to the head drum 4 and the lower drum 5.

The spindle 1 is journalled in the lower drum 5 by means of two sleeve bearings 19, of which the upper bearing is visible in FIG. 1. The electric motor for driving the head drum 4 is accommodated in the lower part of the lower drum 5 and is irrelevant to the present invention. Of the electric motor an end shield 20 and a number of strips 21 for the electrical connection are visible.

Both the head drum and the lower drum are formed with through-going holes 22A and 22B which receive the supports with clearance. In said clearances 22A and 22B the second layers of glue 18A and 18B are situated almost exclusively between the inner walls of the holes and the cylindrical surfaces of the supports. As a result of this the dimension of the air gap b between the two transformer rings 11A and 11B depends only on the dimension of the air gap a between the head drum 4 and the lower drum 5 and on the thickness of the first layers of glue 17A and 17B. Variations in the dimension of the air gap a as a result of temperature variations and variations in thickness of the layers of glue 17A and 17B as a result of temperature variations and/or variations of the relative humidity affect the dimension of the air gap b between the transformer rings. However, the thicknesses of the second layers of glue 18A and 18B and variations in the thicknesses of these layers of glue have no effect.

Between the transformer rings 11A, 11B and the head drum 4 and the lower drum 5, respectively, gaps 23A and 23B formed of such axial dimensions as to preclude that glue of the first layers of glue 17A and 17B which has been urged away from between the first ends of the supports and the transformer rings comes into contact with the head drum 4 and with the lower drum 5, respectively.

The supports 13A and 13B may be made of a radiation-transparent material, for example glass or a plastics. Glass is preferred because of the small coefficient of thermal expansion and because glass does not absorb moisture from the air. The first and second layers of glue may be a type of glue which cures under the influence of radiation, for example an ultraviolet-curing glue. Such types of glue are known and are used for example for connecting optical components to each other. The radiation can reach the layers of glue via the transparent support from the second ends 16A and 16B.

Figure 2:
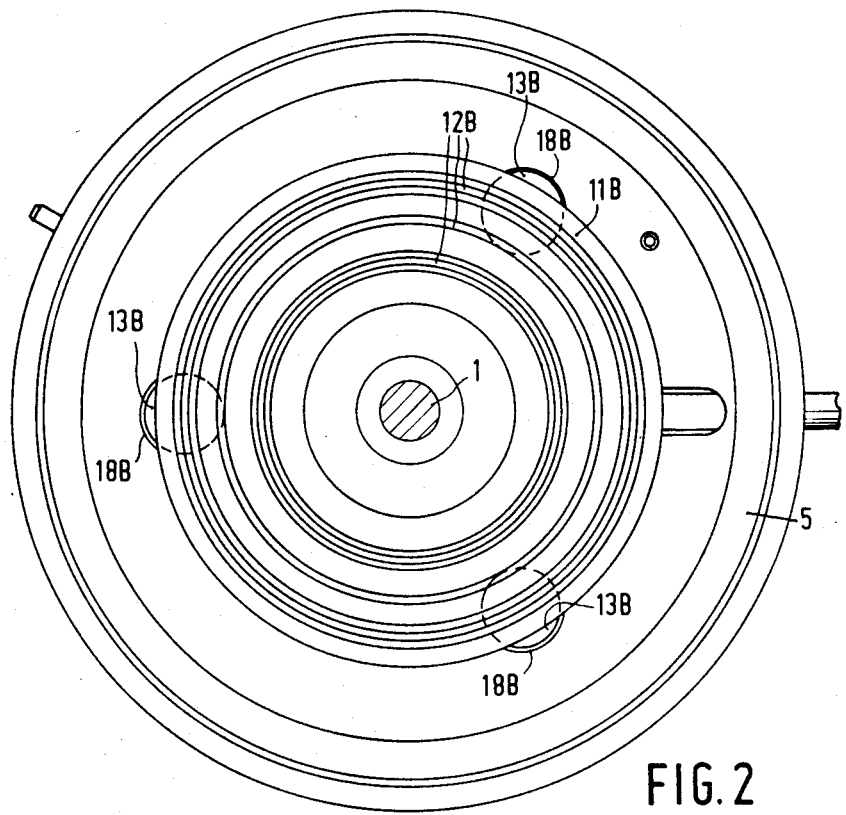
FIG. 2 is a plan view of the stationary scanning means shown in FIG. 1 with the stationary transformer ring mounted in said means.
Figure 3:
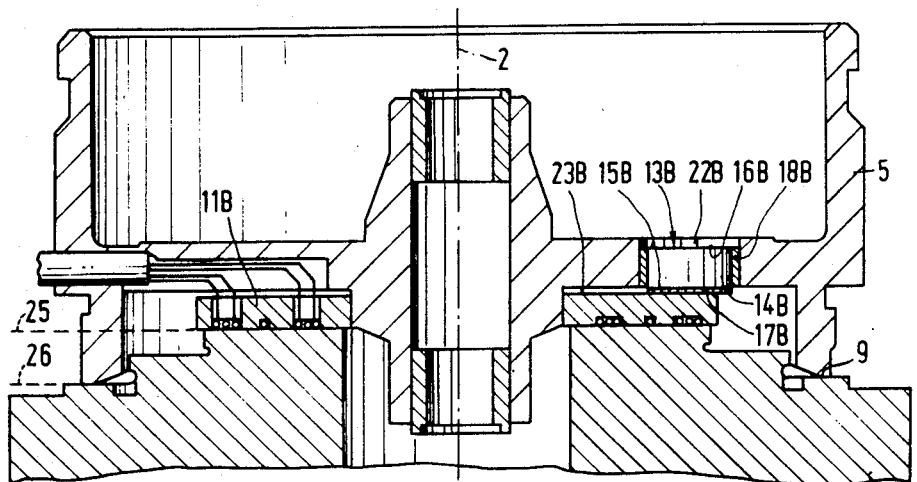
FIG. 3 is a sectional view of the lower scanning means shown in FIG. 1, in the inverted position, together with a transformer ring placed on an auxiliary tool.

The method of manufacturing the magnetic-tape scanning device shown in FIGS. 1 and 2 will be described only in so far as the method relates to the fixation of the transformer ring 11B to the lower drum 5. As is shown in FIG. 3, the transformer ring 11B and the lower drum 5 to which said ring is to be secured are placed on an auxiliary tool 24 in the desired accurate position relative to each other. This auxiliary tool is formed with two accurately machined supporting surfaces 25 and 26 whose distance relative to each other is specified within very tight tolerances. The transformer ring 11B is supported by the supporting surface 25 and the lower drum 5 is supported by the supporting surface 26 at those sides which should face the air gap b between the two transformer rings and the air gap a between the head drum and the lower drum, respectively. The supports 13B are fitted from the top from that side of the lower drum 5 which faces the edge 9. After the desired amounts of glue have been applied the supports are inserted into the throughgoing holes 22B. After application the axial thickness of the first layers of glue 17B is reduced by loading the supports by a weight, not shown, during the time that the first layers of glue have not yet cured and are consequently deformable. By thus urging the supports and the transformer ring towards each other excess glue is squeezed sideways into the gap 23B between the transformer ring and the lower drum. Said gap, as already stated, is dimensioned so that no contact is possible between the excess glue and the lower drum.

What is claimed is:

1. A rotary scanning device, comprising:
   a rotatable scanning means arranged to be rotatable about an axis,
   a rotary transformer comprising a rotatable transformer ring spaced axially from said rotatable scanning means, and a stationary transformer ring, arranged such that a narrow axial gap is formed between said rings, and
   means for mounting said rotatable transformer ring to said rotatable scanning means, comprising a plurality of supports each having an end face, attached by a respective first layer of glue to and extending axially from the rotatable transformer ring and having a cylindrical surface; a corresponding plurality of holes in said rotatable scanning means, each hole having an inner wall arranged with radial clearance from a respective support extending into the hole; and a respective annular second layer of glue distinct from said first layer disposed in each of said clearances, substantially exclusively between the inner wall of the respective hole and the cylindrical surface of the respective support, each said first layer of glue being a thin planar layer having a thickness substantially independent of the axial distance between the rotatable transformer ring and the scanning means.

2. A device as claimed in claim 1, characterized in that said supports are made of a radiation-transparent material, and said glue is a type of glue which is cured under radiation influence.

3. A magnetic-tape scanning device comprising:
   a rotatable scanning means rotatable about a spindle axis, and having a rotating gap edge,
   at least one magnetic head carried on said scanning means, rotatable in a circular path about said axis,
   a stationary scanning means having an external guide surface for guiding magnetic tape past said at least one magnetic head, having an edge disposed at a small distance from the rotating gap edge so that a narrow axial air gap is formed between the rotatable and the stationary scanning means,
   a rotary transformer comprising a rotatable transformer ring secured to the rotatable scanning means concentric with the spindle axis, and a stationary transformer ring secured to the stationary scanning means opposite said rotatable transformer ring, arranged such that a narrow axial gap is formed between said rings, and
   gluing means for at least one of said transformer rings, for securing the respective transformer ring to the respective scanning means, comprising a plurality of cylindrical supports for said at least one respective transformer ring, each support having a cylindrical surface and first and second end faces; a respective first layer of glue disposed between the first end face of each support and the respective transformer ring, for securing the respective first end face to the respective ring; and a respective second layer of glue between each support and the respective scanning means, for securing the respective support to said respective scanning means,
   characterized in that
   the scanning means to which said at least one of the transformer rings is glued is formed with a plurality of holes having axially extending cylindrical inner walls, each hole receiving a respective support with radial clearance, each said first layer of glue is a thin planar layer having a thickness substantially independent of the axial distance between the respective transformer ring and the respective scanning means, and each said second layer of glue is distinct from said first layer and is disposed in a respective clearance, substantially exclusively between the inner wall of the hole and the cylindrical surface of the respective support.

4. A device as claimed in claim 3, characterized in that said at least one of the transformer rings has an axial clearance from the scanning means to which it is glued, sufficient to permit excess glue of the first layers of glue to form around the respective support without contact with the respective scanning means.

5. A device as claimed in claim 4, characterized in that said supports are made of a radiation-transparent material, said holes in the scanning means to which said at least one of the two transformer rings is glued are through holes, and at least one of said layers of glue is a type of glue which cures under the influence of radiation.

6. A method of manufacturing a rotating scanning device having a scanning means having an edge which defines an end of an axial air gap, and a rotary transformer including a transformer ring secured to said scanning device by gluing means, said gluing means comprising an axially extending through hole in said scanning means and a support disposed in said through hole and glued to said transformer ring, comprising the steps of providing an auxiliary tool having a transformer ring aligning surface and an edge aligning surface, placing a transformer ring against said transformer ring aligning surface and the edge of a scanning means against said edge aligning surface, inserting a support into said hole from a side of the scanning means opposite said transformer ring, and providing a thin planar first glue layer between said support and said transformer ring and an annular second glue layer distinct from said first layer between said support surface and the inner wall of the hole.

7. A method as claimed in claim 6, characterized by the step, after providing said first layer of glue, of reducing the axial thickness of said first layer of glue by urging said support and said transformer ring toward each other while said first layer of glue is still deformable.

8. A method as claimed in claim 6, characterized in that said support is made of a radiation-transparent material, said glue is selected to be of a type of glue which cures under the influence of radiation, and said first and second layers of glue are cured simultaneously by application of radiation through said through hole.

* * * * *